United States Patent [19]

Savitz

[11] Patent Number: 5,136,766
[45] Date of Patent: Aug. 11, 1992

[54] ROLLING MILL SLEEVE

[75] Inventor: Victor L. Savitz, Pittsfield, Pa.

[73] Assignee: National Roll Inc, Avonmore, Pa.

[21] Appl. No.: 651,959

[22] Filed: Feb. 7, 1991

[51] Int. Cl.⁵ .............................................. F16C 13/02
[52] U.S. Cl. .................................. 29/129.5; 29/895.1;
29/402.13; 29/402.16; 29/898.01; 384/281
[58] Field of Search .......... 72/236; 29/402.09, 402.11,
29/402.13, 402.16, 895.1, 898.01, 129.5;
384/282, 283, 276, 280, 281

[56] References Cited

U.S. PATENT DOCUMENTS 4,159,152 6/1979 Bjork .............................. 72/236 X
4,384,748 5/1983 Naoi et al. ............................ 72/199

Primary Examiner—Timothy V. Eley
Attorney, Agent, or Firm—Harry B. Keck

[57] ABSTRACT

Keyways can be eliminated from rolling mill sleeves by undercutting the existing keyway to a generally trapezoidal cross section and preparing a corresponding keyway filler from comparable metal. The keyway filler is thicker than the keyway. The excess metal from the keyway filler is removed after the keyway filler is press fitted into the undercut keyway.

5 Claims, 2 Drawing Sheets

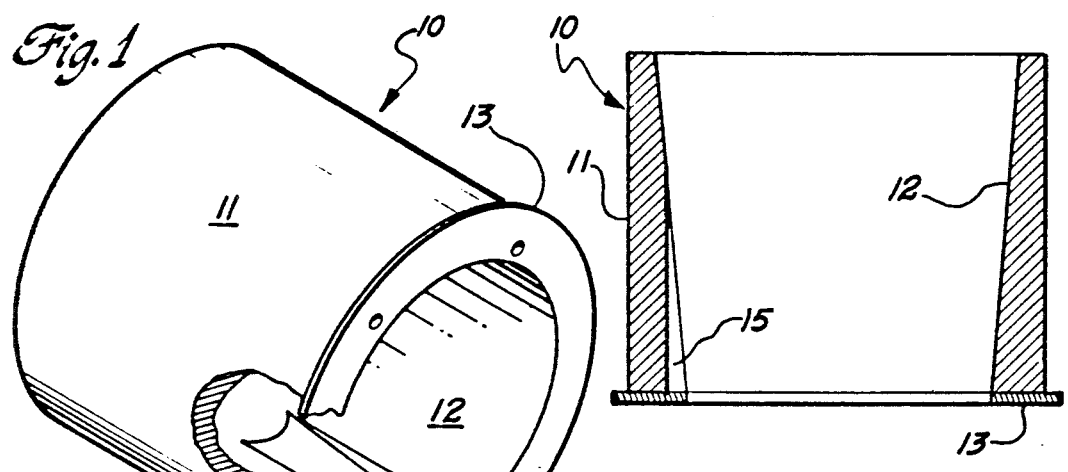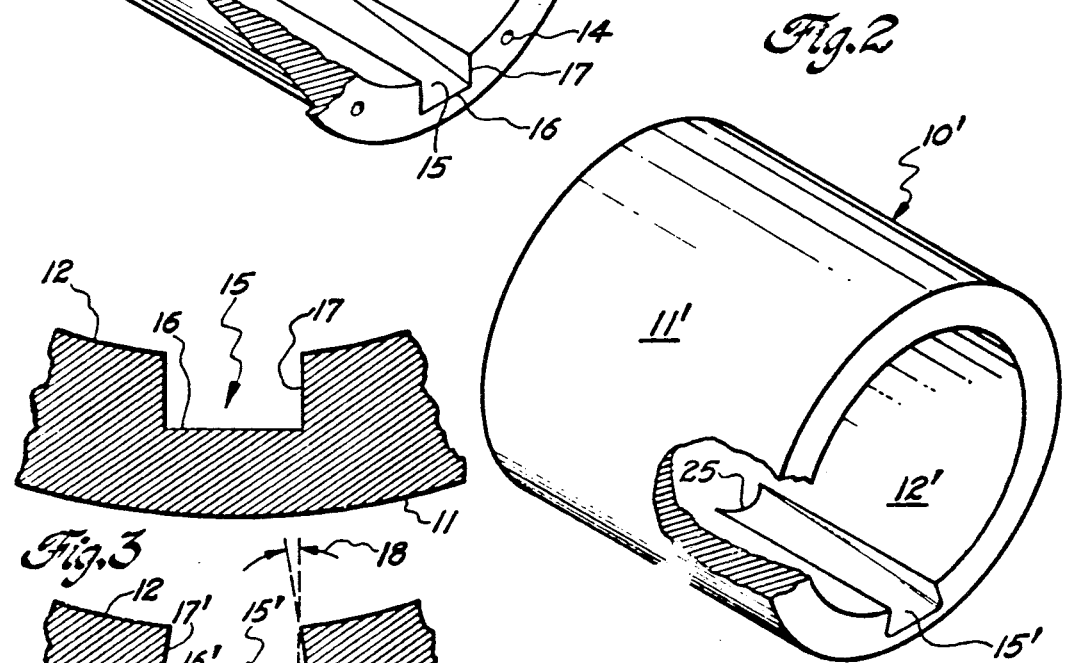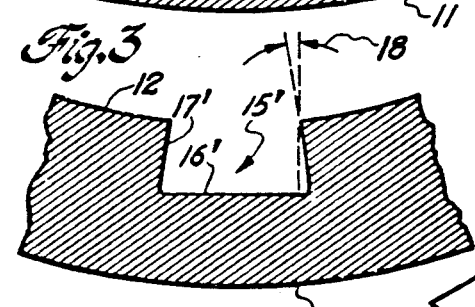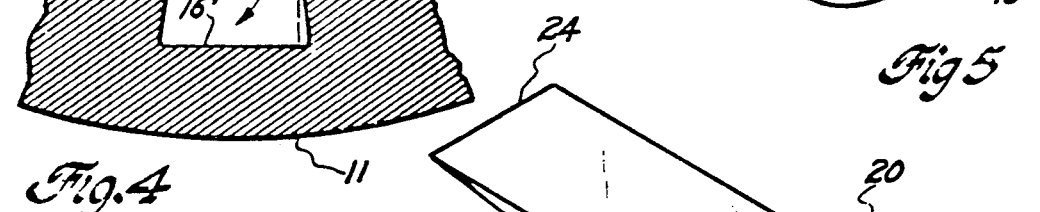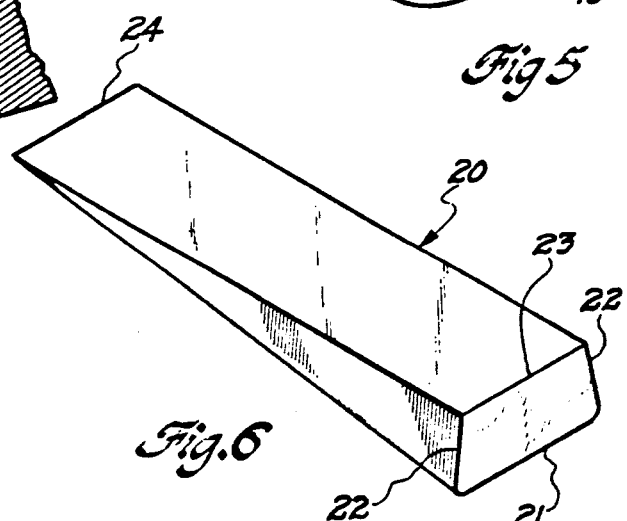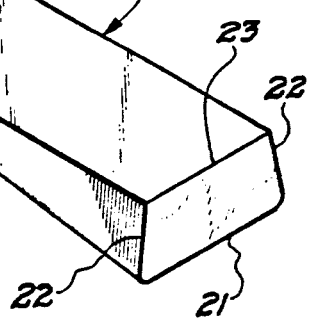

ROLLING MILL SLEEVE

BACKGROUND OF THE INVENTION

1. Field of the Invention

This invention relates to sleeves for rolling mills and more particularly to a method for filling an existing keyway in such sleeves and the resulting sleeve.

2. Description of the Prior Art

Roll neck bearings in rolling mills include a sleeve with a cylindrical outer surface and a conical inner surface fitted on a conical roll neck and secured by a key fitted into a keyway in the sleeve and a corresponding keyway in the roll neck. U.S. Pat. Nos. 4,159,152; 4,384,748. The function of the sleeve is to protect the expensive roll and to accept most of the wear resulting from operation of the roll and the sleeve. Worn sleeves can be restored for re-use.

Occasionally there is a need to eliminate the keyway from an existing sleeve in order to provide a new keyway of differing geometry. It is important to restore the sleeve by providing that the filled keyway has structural properties corresponding to those of the remainder of the sleeve.

DESCRIPTION OF THE PREFERRED INVENTION

According to the present invention, a rolling mill sleeve keyway can be filled by undercutting the existing keyway and preparing a keyway filler, thicker than the undercut keyway, from steel corresponding to the steel of the sleeve; and thereafter inserting the keyway filler into the undercut keyway; and thereafter machining the inner surface of the sleeve and the exposed surface of the keyway filler. By undercutting the existing keyway and providing a correspondingly shaped keyway filler, a press fit can be achieved between the keyway filler and the undercut keyway. The resulting sleeve exhibits uniform physical characteristics throughout its periphery including the region of the filled undercut keyway. The undercut keyway and the keyway filler have a generally trapezoidal cross-section.

DESCRIPTION OF THE DRAWINGS

FIG. 1 is a perspective illustration of a typical flanged rolling mill sleeve having a keyway.

FIG. 2 is a cross-section view taken along the diameter of the sleeve of FIG. 1 through the center of the keyway.

FIG. 3 is a fragmentary cross section view of the keyway portion of the sleeve of FIG. 1.

FIG. 4 is a fragmentary cross section view corresponding to FIG. 3 of the keyway portion of the sleeve of FIG. 1 after the keyway has been undercut according to the present invention.

FIG. 5 is a perspective illustration of a non-flanged rolling mill sleeve corresponding to FIG. 1 illustrating an undercut keyway.

FIG. 6 is a perspective illustration of a keyway filler.

DESCRIPTION OF THE PREFERRED EMBODIMENTS

Figure 7:
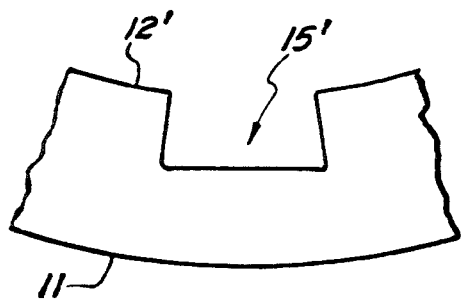
FIG. 7 is a fragmentary end view of a portion of the sleeve of FIG. 5 with an undercut keyway.

A typical rolling mill sleeve 10 of FIGS. 1, 2 and 3 has a cylindrical outer wall 11, a conically tapered inner wall 12 and a radial flange ring 13 which may be secured to the sleeve 10 by means of countersunk bolts 14. A typical sleeve 10 has a length of about 33 inches and a cylindrical surface diameter about 42 inches. The inner surface of the sleeve has a taper from about 33 inches diameter to about 37 inches diameter.

A keyway 15 in the sleeve 10 extends approximately one-half of the length of the sleeve. The base 16 of the keyway has a width of about 4 inches. Parallel keyway side walls 17 are about 1.5 inches deep at the outer edge of the sleeve and taper to zero at the inner end of the keyway 15. The throat of the keyway is the same width as the base 16. The taper of the inner walls of rolling mill sleeves subtends an angle of approximately 10 degrees, i.e., each inner wall 12 is displaced by approximately 5 degrees from the sleeve longitudinal axis. Thus the sleeve diameter in its tapered inner wall reduces approximately 2⅛ inch per foot of length of the sleeve.

In order to fill the keyway 15, the sleeve 10 is machined on a horizontal milling machine to undercut the existing keyway by widening the base 16' and tapering the side wall 17' as illustrated in FIG. 4. The angle 18 (FIG. 4) is about 5 degrees. A corresponding keyway filler 20 is illustrated in FIG. 6. The base 21 corresponds to the undercut keyway base 16' of FIG. 5. The filler side walls 22 radially diverge at an angle which complements the angle 18. The height of the keyway filler between the base 21 and a top 23 is slightly greater than the depth of the undercut keyway 15'. The side walls 22 taper from the outer dimension to a sharp edge 24. The overall length of the keyway filler 20 is slightly longer than the length of the undercut keyway 15' to assure a tight fit. Excess metal can be machined to the desired level.

Figure 9:
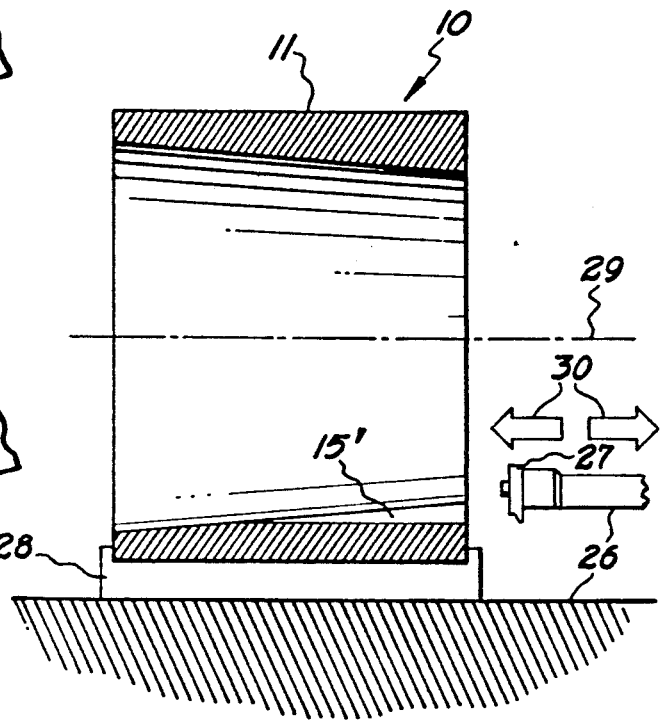
FIG. 9 is a sectional view of a sleeve positioned on a horizontal milling machine for undercutting a sleeve keyway.

It will be observed from FIG. 5 that the undercut keyway 15' has an arcuate inner edge 25 which results when the keyway 15 is machined in position to conform to the inner sleeve wall 12'. Referring to FIG. 9, it will be observed that the sleeve 10 is positioned on a horizontal milling machine 26 having a horizontally rotating cutter head 27 and a horizontally oscillating bed 28. The sleeve diameter 29 is parallel to the line of oscillation 30 of the oscillating bed 28. The base 16' of the undercut keyway 15' is parallel to the outer surface 11 of the sleeve 10'.

Figure 8:
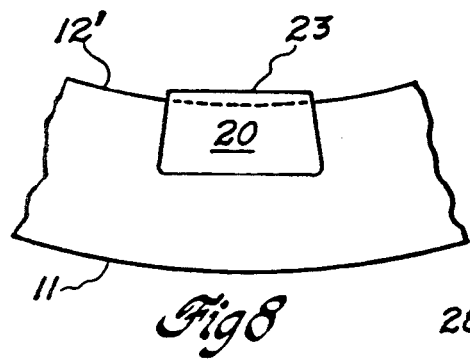
FIG. 8 is a fragmentary end view similar to FIG. 7 of a portion of the sleeve of FIG. 5 with a keyway filler positioned within an undercut keyway.

The keyway filler 20 is inserted in the undercut keyway 15' as shown in FIG. 8. The oversized character of the keyway filler 20 is apparent from FIG. 8. The sleeve 10' with the keyway filler 20 is thereafter tilted according to the taper of the sleeve 10' and the inner surface 12' of the sleeve 10' is reestablished in the horizontal milling machine as shown in FIG. 9. The inner portion of the keyway filler 20 (FIG. 8) is removed so that the inner surface of the keyway filler 20 corresponds to the inner surface 12' of the sleeve 10'. Because the inner diameter 12' is slightly greater than that of the original sleeve, a portion 31 of the sleeve 10' is removed and a ring 32 of the same metal is secured to the narrow end of the sleeve 10'. The ring 32 restores the original length of the sleeve 10 and may serve to secure the keyway filler 20 within the undercut keyway 15'.

Figure 10:
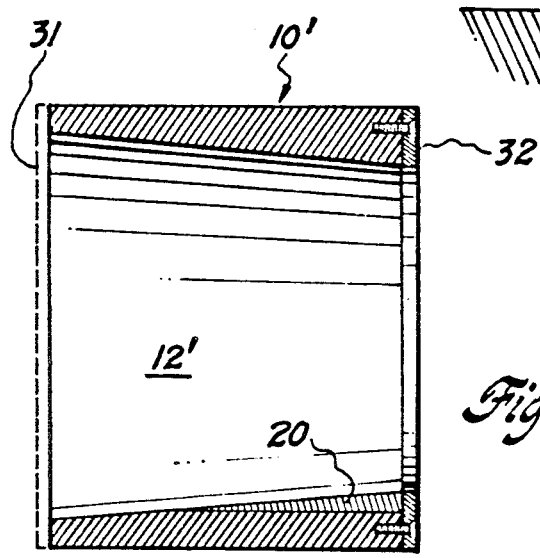
FIG. 10 is a cross-section view of a portion of a non-flanged sleeve having a filled keyway.

In general there are two types of rolling mill sleeves. One type has no projecting flange and is illustrated in FIGS. 5, 9 and 10. The other type has a radial flange at the outer end and is illustrated in FIGS. 1 and 2.

In a typical rolling mill sleeve, the sleeve is fabricated from A1S4140 steel. A preferred similar steel for the keyway filler is A1S4350 or A1S4140.

The corners of the undercut keyway 15' between the surfaces 17' and base 16' are shown as angled corners. However these corners are rounded in practice on a radius of approximately ⅛-inch which is a feasible tolerance for a horizontal milling machine. Similarly the edges of the keyway filler 20 between the side walls 22 and the base 21 are correspondingly arcuate and preferably along a ⅛-inch radius.

ALTERNATIVE EMBODIMENTS

Figure 11:
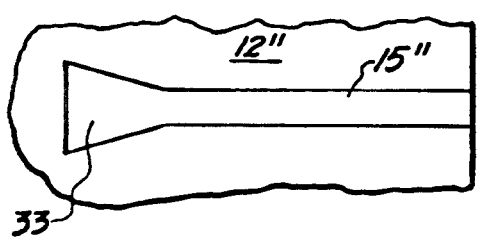
FIG. 11 is a fragmentary plan view of a portion of a sleeve having a keyway which is found in some rolling mill sleeves.
Figure 12:
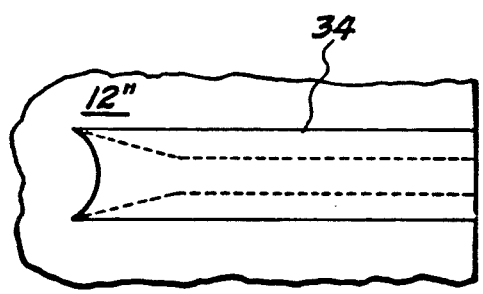
FIG. 12 is a fragmentary plan view of the sleeve portion of FIG. 11 with an undercut keyway provided according to the present invention.

As shown in FIG. 11, a sleeve inner surface 12" may have a keyway 15" with a dovetail inner portion 33. The function of the dovetail inner portion 33 is to facilitate entry of a key into the keyway 15" when the sleeve is applied to a roll end. In order to apply the present invention to such sleeves, a new undercut keyway 34 is provided as shown in FIG. 12 wherein the entire key is cut to a width corresponding to the base of the dovetail portion 33. The resulting enlarged uniform width keyway 34 is undercut as described herein.

Experience has demonstrated that replacement keyways prepared and installed as described herein will present uniform structural characteristics throughout the periphery of the resulting sleeve.

I claim:

1. A rolling mill sleeve having a filled keyway and having substantially uniform structural characteristics throughout its periphery, comprising a trapezoidal cross-section keyway having a base within said sleeve and having a throat at the inner surface of said sleeve, said base being wider than said throat and having side walls which diverge from said throat toward said base,
   a keyway filler having a trapezoidal cross-section corresponding to the cross-section of said keyway and having an inner surface corresponding to the inner wall of said sleeve,
   said keyway filler being press-fitted in said keyway.

2. The rolling mill sleeve of claim 1 including a ring having an inner diameter corresponding to the inner diameter of said sleeve adjacent to the opening of said keyway, said ring being secured to said sleeve.

3. A rolling mill sleeve of claim 2 having a tapered inner wall and a central longitudinal axis, a cylindrical ring secured coaxially to said sleeve adjacent to the narrow end of said tapered inner wall, said ring having an inner diameter corresponding to the adjacent inner diameter of said tapered inner wall.

4. The rolling mill sleeve of claim 1 wherein said base is a substantially flat surface and extends from one end of said sleeve to the central portion of said sleeve.

5. A rolling mill sleeve of claim 1 wherein said sleeve and said keyway filler are formed from the same grade of steel.

* * * * *